(12) United States Patent
Wu et al.

(10) Patent No.: US 12,050,492 B2
(45) Date of Patent: Jul. 30, 2024

(54) ELECTRONIC DEVICE

(71) Applicant: ASUSTEK COMPUTER INC., Taipei (TW)

(72) Inventors: Yalin Wu, Taipei (TW); Tsung-Ju Chiang, Taipei (TW); Wei-Chuan Chen, Taipei (TW); Po-Nien Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 63 days.

(21) Appl. No.: 17/744,113

(22) Filed: May 13, 2022

(65) Prior Publication Data

US 2023/0054249 A1 Feb. 23, 2023

(30) Foreign Application Priority Data

Aug. 17, 2021 (TW) ................. 110130204

(51) Int. Cl.
*G06F 1/16* (2006.01)

(52) U.S. Cl.
CPC .......... *G06F 1/1681* (2013.01); *G06F 1/1616* (2013.01); *G06F 1/166* (2013.01)

(58) Field of Classification Search
CPC ...... G06F 1/1681; G06F 1/1616; G06F 1/166; G06F 1/1652
See application file for complete search history.

(56) References Cited

U.S. PATENT DOCUMENTS

| | | | | |
|---|---|---|---|---|
| 8,359,078 B2* | 1/2013 | Hung | ..................... | B65D 25/00 455/575.8 |
| 8,539,705 B2* | 9/2013 | Bullister | ............... | G06F 1/1615 361/679.04 |
| 8,731,626 B2* | 5/2014 | Hung | ..................... | B65D 25/00 455/575.8 |
| 11,054,864 B1 | 7/2021 | Watamura et al. | | |
| 11,644,864 B2* | 5/2023 | Seo | ........................ | G06F 1/1652 361/679.01 |

(Continued)

FOREIGN PATENT DOCUMENTS

| | | |
|---|---|---|
| CN | 204595676 U | 8/2015 |
| CN | 305361699 S | 9/2019 |
| TW | M422282 U | 2/2021 |

*Primary Examiner* — Anthony M Haughton
*Assistant Examiner* — Theron S Milliser
(74) *Attorney, Agent, or Firm* — Muncy, Geissler, Olds & Lowe, P.C.

(57) ABSTRACT

An electronic device includes a first body, a first pivot structure, a second body, a first plate, a second plate, a third plate, a second pivot structure, and a third pivot structure. The first body includes a first region and a second region. The second body includes a third region and a fourth region. The second body is pivotally connected to the first body by the first pivot structure. The first plate is disposed corresponding to the first region. The second plate is disposed corresponding to the third region. The third plate is disposed corresponding to the fourth region. One side of the third plate is adjacent to the second plate, and the other side of the third plate is detachably coupled to the first plate. The second pivot structure connects the first body and the first plate. The third pivot structure connects the second body and the second plate.

6 Claims, 9 Drawing Sheets

(56) References Cited

U.S. PATENT DOCUMENTS

| | | | |
|---|---|---|---|
| 11,698,662 B2* | 7/2023 | Xianyu | G06F 1/1652 |
| | | | 361/679.27 |
| 2007/0279315 A1* | 12/2007 | Laves | H04M 1/0268 |
| | | | 345/1.1 |
| 2010/0041439 A1* | 2/2010 | Bullister | G06F 1/165 |
| | | | 455/566 |
| 2010/0300909 A1* | 12/2010 | Hung | H04M 1/04 |
| | | | 206/320 |
| 2013/0126365 A1* | 5/2013 | Hung | B65D 25/00 |
| | | | 206/45.24 |
| 2018/0252355 A1* | 9/2018 | Chen | F16M 13/005 |
| 2022/0043480 A1* | 2/2022 | Seo | G06F 1/1652 |
| 2022/0283608 A1* | 9/2022 | Xianyu | G06F 1/1641 |

* cited by examiner

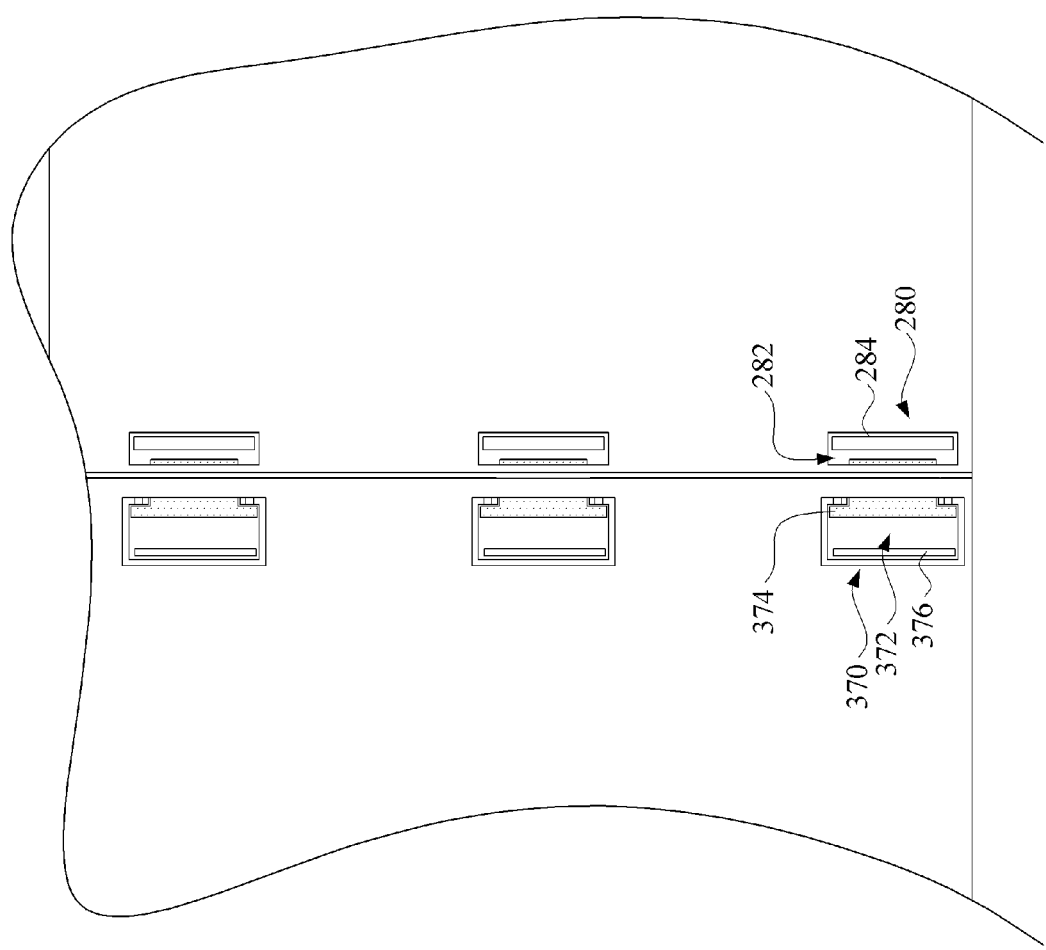

ELECTRONIC DEVICE

CROSS-REFERENCE TO RELATED APPLICATION

This application claims the priority benefit of Taiwan Application Serial No. 110130204, filed on Aug. 17, 2021. The entirety of the above-mentioned patent application is hereby incorporated by reference herein and made a part of specification.

BACKGROUND OF THE INVENTION

Field of the Invention

The disclosure relates to an electronic device and in particular, to an electronic device including a support.

Description of the Related Art

Conventionally, a support included by an electronic device (such as a tablet computer) merely provides a supporting effect in a single direction (in an embodiment, horizontally placement direction), and consequently, is limited in terms of use.

BRIEF SUMMARY OF THE INVENTION

The disclosure provides an electronic device. The electronic device includes a first body, a first pivot structure, a second body, a first plate, a second plate, a third plate, a second pivot structure, and a third pivot structure.

A rear surface of the first body is divided into a first region and a second region. The first pivot structure has a first rotation direction. A rear surface of the second body is divided into a third region and a fourth region. The second body is pivotally connected to the first body by the first pivot structure.

The first plate is disposed corresponding to the first region, where one side of the first plate includes a first coupling member. The second plate is disposed corresponding to the third region. The third plate is disposed corresponding to the fourth region and includes a second coupling member. One side of the third plate is adjacent to the second plate, and the other side of the third plate is detachably coupled to the first coupling member through the second coupling member.

The second pivot structure connects the first body and the first plate, and has a second rotation direction. The second rotation direction is perpendicular to the first rotation direction. The third pivot structure is close to the first pivot structure, connects the second body and the second plate, and has a third rotation direction. The third rotation direction is parallel to the first rotation direction.

The electronic device of the disclosure includes the first plate, the second plate, and the third plate, which, as supports, provide supporting effects in two placement directions, that is, a horizontal placement direction and a vertical placement direction, and provide a user with more diversified choices in use.

BRIEF DESCRIPTION OF THE DRAWINGS

FIG. 8 is a schematic diagram of a first coupling member and a second coupling member according to another embodiment of the disclosure.

DETAILED DESCRIPTION OF THE EMBODIMENTS

More detailed descriptions of specific embodiments of the disclosure are provided below with reference to the schematic diagrams. The advantages and features of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
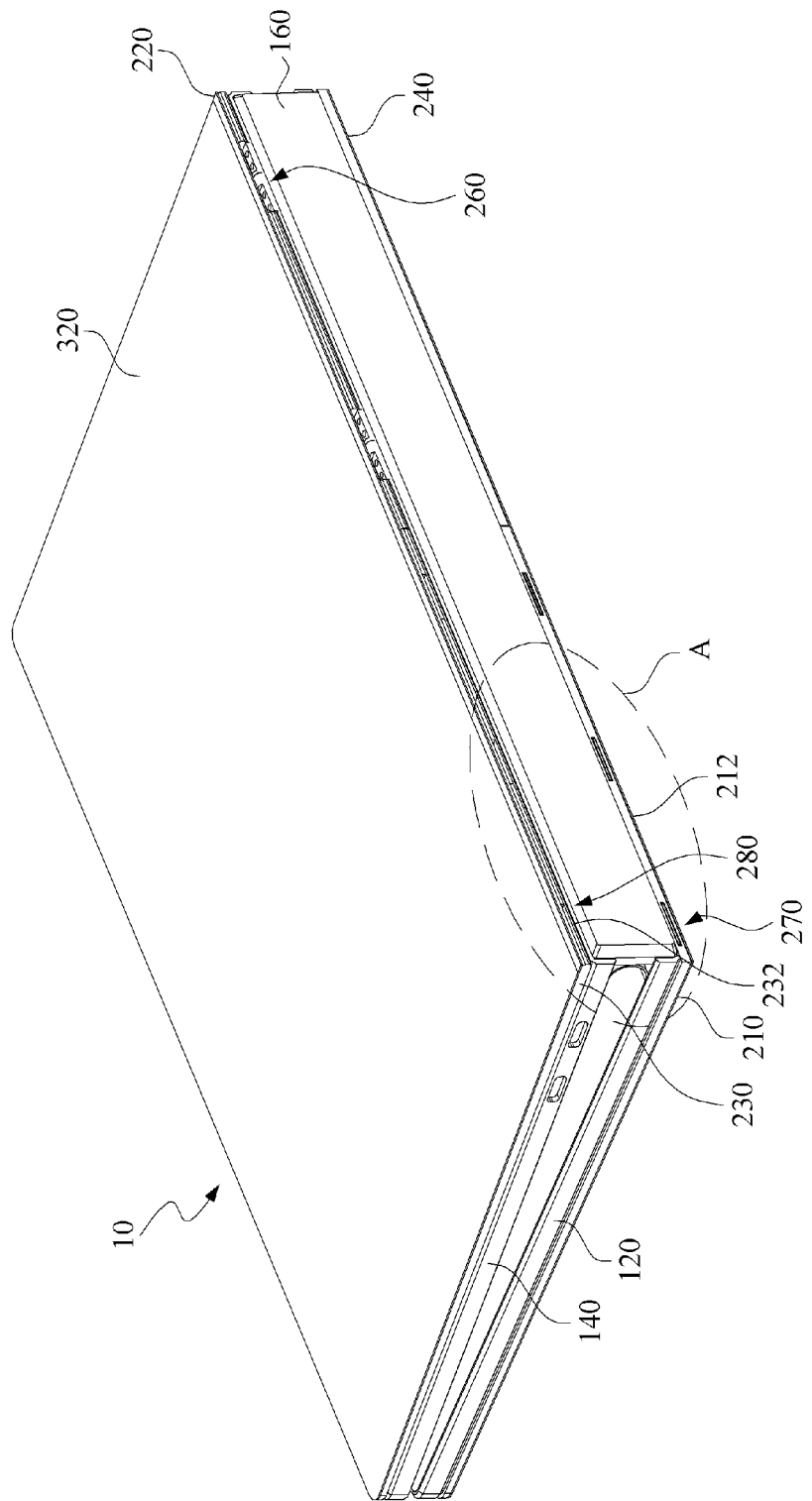
FIG. 1 is a schematic three-dimensional diagram of an embodiment of an electronic device in a closed state according to the disclosure.
Figure 2:
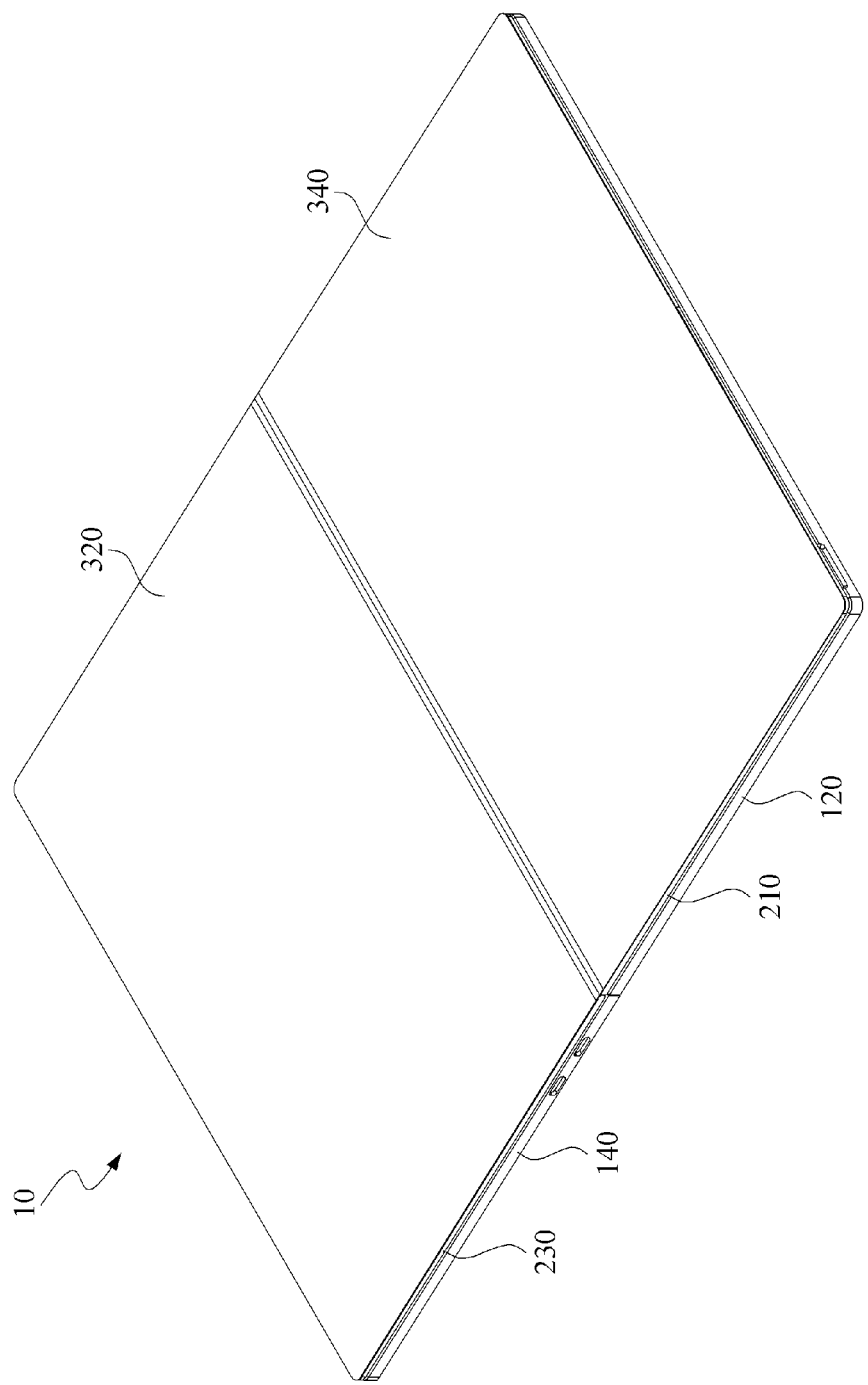
FIG. 2 is a schematic three-dimensional diagram of an embodiment of an electronic device in an open state according to the disclosure.
Figure 3:
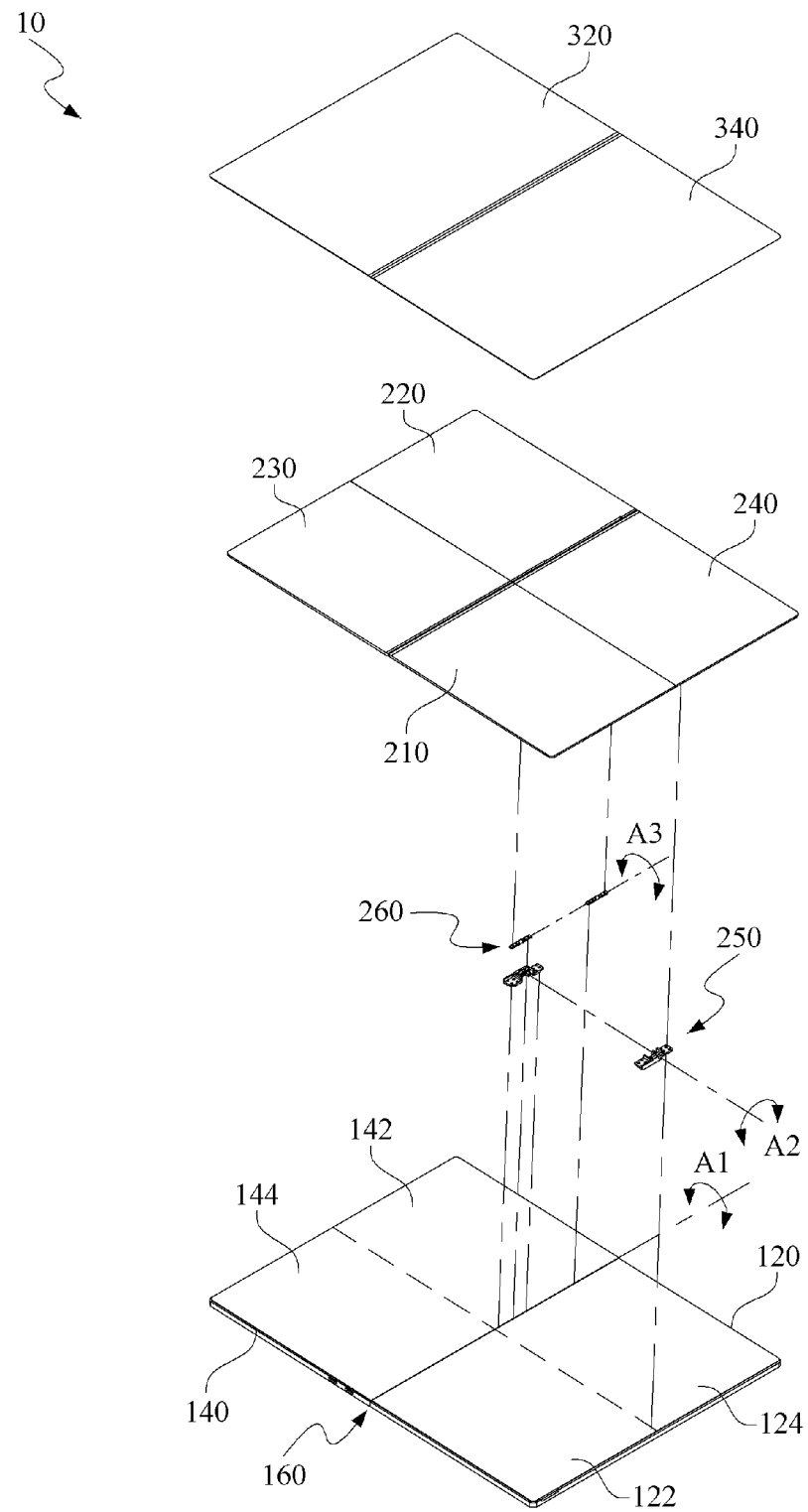
FIG. 3 is a schematic exploded view of an electronic device according to the disclosure.
Figure 4:
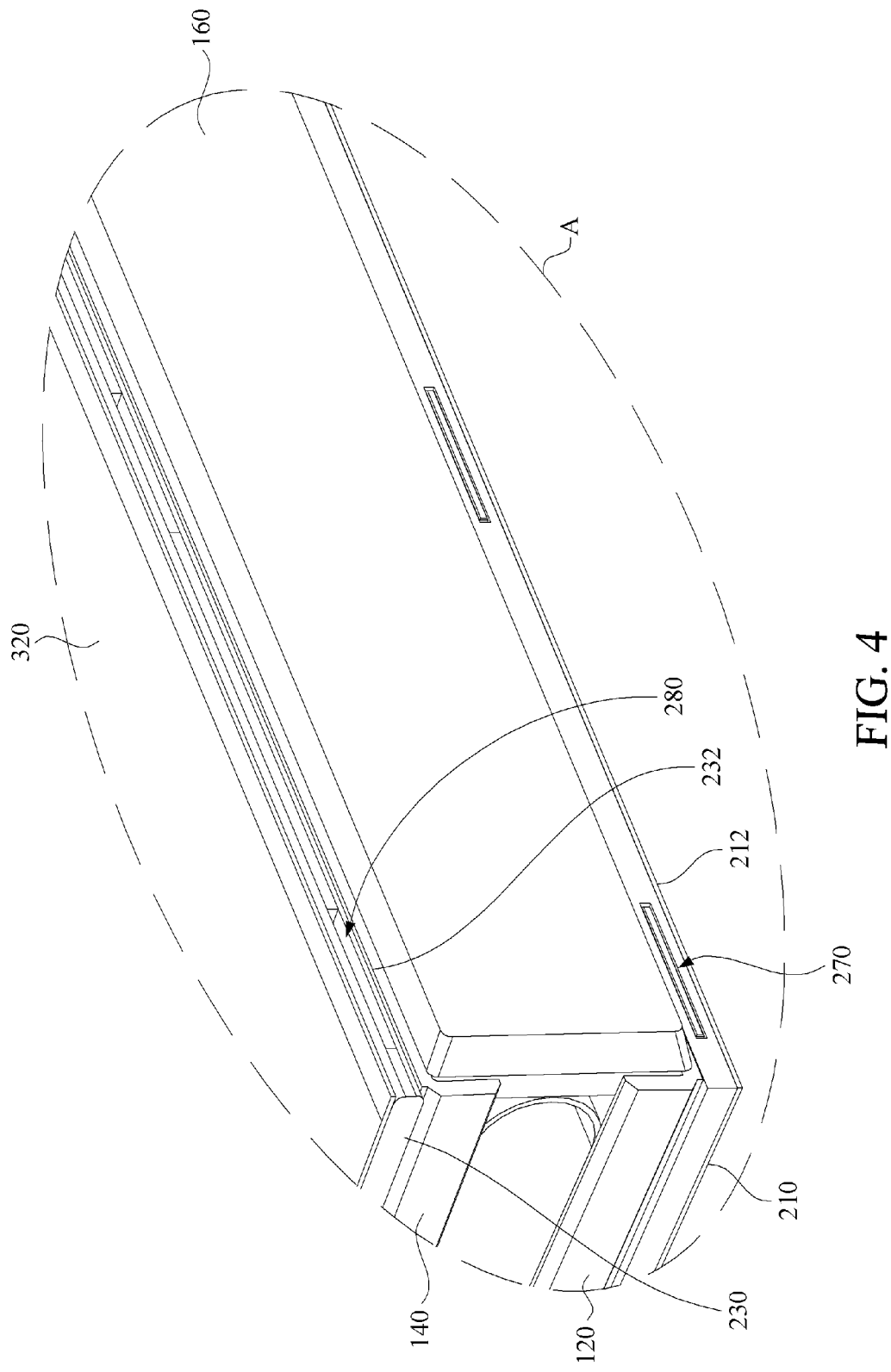
FIG. 4 is a schematic enlarged view of a first region A in FIG. 1.

FIG. 1 is a schematic three-dimensional diagram of an embodiment of an electronic device in a closed state according to the disclosure. FIG. 2 is a schematic three-dimensional diagram of an embodiment of an electronic device in an open state according to the disclosure. FIG. 3 is a schematic exploded view of an electronic device according to the disclosure. FIG. 4 is a schematic enlarged view of a first region A in FIG. 1.

As shown in figures, in an embodiment, an electronic device 10 is a notebook computer, including: a first body 120, a second body 140, a first pivot structure 160, a first plate 210, a second plate 220, a third plate 230, a fourth plate 240, at least one second pivot structure 250, at least one third pivot structure 260, a first flexible coating layer 320, and a second flexible coating layer 340.

As shown in FIG. 3, a rear surface of the first body 120 is divided into a first region 122 and a second region 124. A rear surface of the second body 140 is divided into a third region 142 and a fourth region 144. The first pivot structure 160 has a first rotation direction A1.

The second body 140 is pivotally connected to the first body 120 by the first pivot structure 160. The first pivot structure 160 is a rotating shaft structure. The second body 140 and the first body 120 constitute a main body of the electronic device 10.

In an embodiment, the first body 120 is a screen part of the electronic device 10, and the second body 140 is a host part of the electronic device 10, but the disclosure is not limited thereto.

In an embodiment, both the first body 120 and the second body 140 include screens, and the screens constitute a flat panel in an open state.

The first plate 210 is disposed corresponding to the first region 122. The second plate 220 is disposed corresponding to the third region 142. The third plate 230 is disposed corresponding to the fourth region 144. The fourth plate 240 is disposed corresponding to the second region 124.

The first plate 210, the second plate 220, the third plate 230, and the fourth plate 240 are located on rear surfaces of the first body 120 and the second body 140. For the electronic device 10 including the screens, the first plate 210, the second plate 220, the third plate 230, and the fourth plate 240 are located on rear surfaces of screens. The first plate 210, the second plate 220, the third plate 230 and the fourth plate 240 are rigid plates, and are used as a protective shell of the electronic device 10 and as supports of the electronic device 10 to provide support in a horizontal direction and a vertical direction.

The second pivot structure 250 connects the first body 120 and the first plate 210, and has a second rotation direction A2. FIG. 3 shows two second pivot structures 250. The second pivot structure 250 is a rotating shaft structure. The second rotation direction A2 is perpendicular to the first rotation direction A1 of the first pivot structure 160. In an embodiment, the second pivot structure 250 is alternatively a torque hinge. The torque hinge provides resistance to fix the first plate 210 at a needed angle, so as to support the first body 120 and the second body 140 in a horizontal placement direction.

The third pivot structure 260 connects the second body 140 and the second plate 220, and has a third rotation direction A3. The figure shows two third pivot structures 260. The third pivot structure is a rotating shaft structure. The third rotation direction A3 is parallel to the first rotation direction A1 of the first pivot structure 160, and the third pivot structure 260 is close to the first pivot structure 160.

The third plate 230 is coupled to the second plate 220. The fourth plate 240 is fixed to the first body 120, and is coupled to the first plate 210.

In an embodiment, as shown in the figure, the first flexible coating layer 320 covers outer side surfaces of the second plate 220 and the third plate 230, so that the third plate 230 is coupled to the second plate 220.

The second flexible coating layer 340 covers outer side surfaces of the fourth plate 240 and the first plate 210, so that the first plate 210 is coupled to the fourth plate 240.

In the foregoing embodiments, the third plate 230 is coupled to the second plate 220 through the first flexible coating layer 320, and the first plate 210 is coupled to the fourth plate 240 through the second flexible coating layer 340, but the disclosure is not limited thereto. In another embodiment, a rotating shaft structure is alternatively disposed between the third plate 230 and the second plate 220 and between the first plate 210 and the fourth plate 240 for connection.

In the foregoing embodiments, the fourth plate 240 is fixed to the first body 120. The fourth plate 240, together with the first plate 210, the second plate 220 and the third plate 230, fully covers outer side surfaces of the first body 120 and the second body 140 for protection, but the disclosure is not limited thereto. In another embodiment, the fourth plate 240 is alternatively omitted, and the first plate 210 is pivotally connected to the first body 120 directly.

Referring to FIG. 1 and FIG. 4, a first side 212 of the first plate 210 includes at least one first coupling member 270. One side of the third plate 230 is adjacent to the second plate 220, and the other side of the third plate 230, that is, a second side 232 facing the first plate 210, includes at least a second coupling member 280, configured to detachably couple to the first coupling member 270. In such an architecture, the third plate 230 is detachably coupled to the first coupling member 270 through the second coupling member 280, and is easily decoupled from the first plate 210. In this embodiment, three first coupling members 270 and three second coupling members 280 are used as an example. The first coupling members 270 and the second coupling members 280 correspond to each other. In an embodiment, the first coupling member 270 is detachably coupled to the second coupling member 280 through magnetic attraction.

Figure 5:
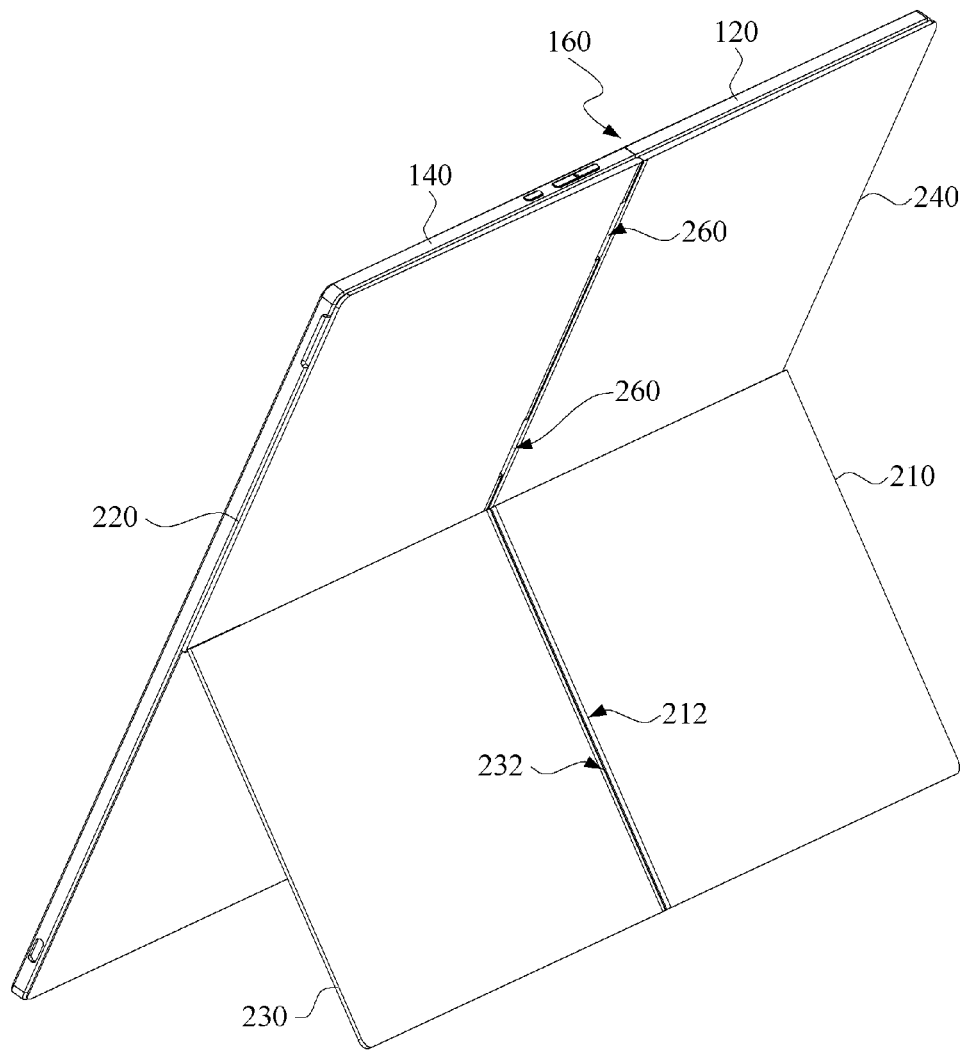
FIG. 5 is a schematic three-dimensional diagram of an electronic device in a horizontal placement direction according to the disclosure.
Figure 6:
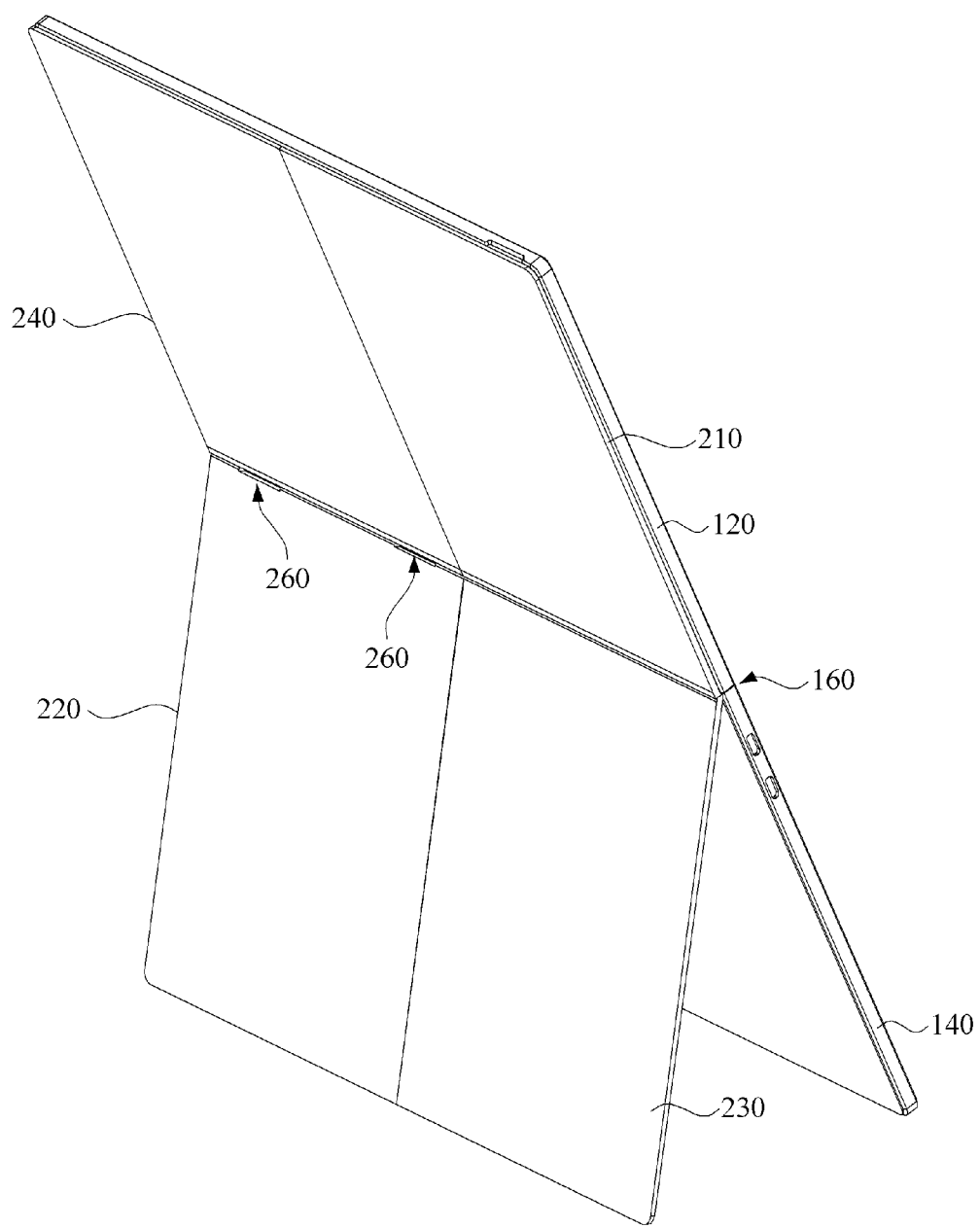
FIG. 6 is a schematic three-dimensional diagram of an electronic device in a vertical placement direction according to the disclosure.

Through disposition of the first plate 210, the second plate 220, the third plate 230, and the fourth plate 240, the electronic device 10 of the disclosure provides two different placement directions for a user to choose, as shown in FIG. 5 and FIG. 6 of the disclosure. FIG. 5 is a schematic three-dimensional diagram of the electronic device 10 in a horizontal placement direction according to the disclosure, and FIG. 6 is a schematic three-dimensional diagram of the electronic device 10 in a vertical placement direction according to the disclosure;

As shown in FIG. 5, when the electronic device 10 is in a horizontal placement direction, the first plate 210 and the third plate 230 are pulled outward away from rear surfaces of the first body 120 and the second body 140. Through the design of the coupling between the first coupling member 270 and the second coupling member 280, the third plate 230 moves with the first plate 210. In this way, the user only needs to pull one of the first plate 210 and the third plate 230 to move the first plate 210 and the third plate 230 to fixed positions simultaneously.

As shown in FIG. 6, when the electronic device 10 is in a vertical placement direction, the second plate 220 and the third plate 230 are pulled outward away from a rear surface of the second body 140. Through the coupling effect of the first flexible coating layer 320, the third plate 230 moves with the second plate 220. In this way, the user only needs to pull one of the second plate 220 and the third plate 230 to move the second plate 220 and the third plate 230 to fixed positions simultaneously.

In an embodiment, the third pivot structure 260 is alternatively a torque hinge. The torque hinge provides resistance to fix the second plate 220 at a needed angle, so as to support the first body 120 and the second body 140 in a vertical placement direction.

Figure 7A:
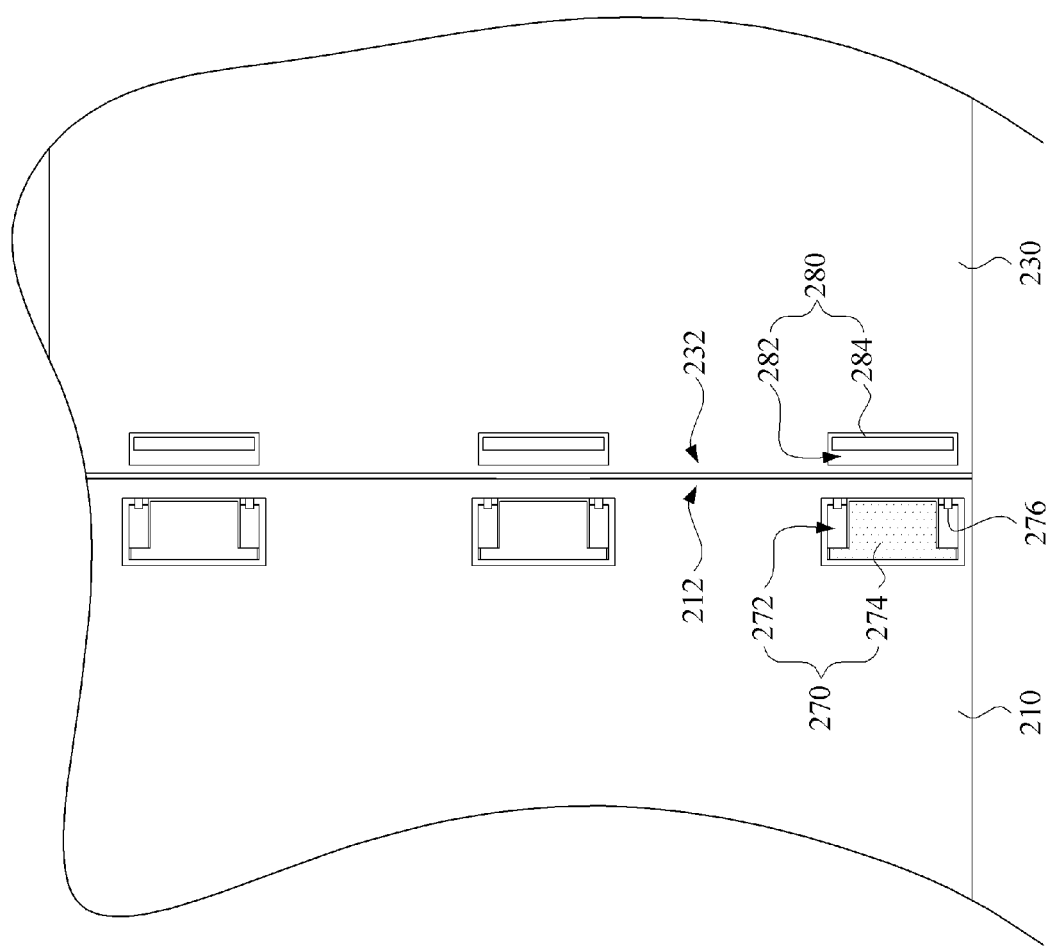
FIG. 7A is a schematic diagram of a first coupling member and a second coupling member that are in a decoupled state according to an embodiment of the disclosure.
Figure 7B:
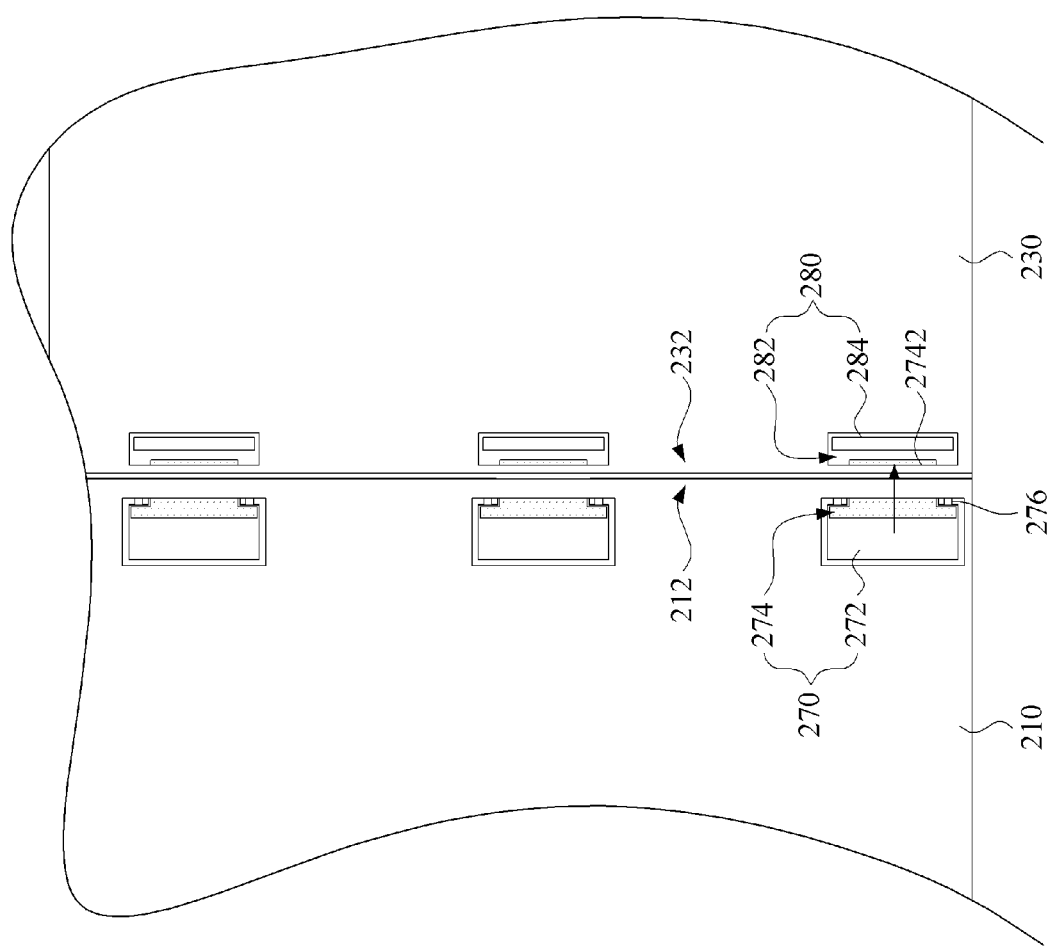
FIG. 7B is a schematic diagram of a first coupling member and a second coupling member that are in a coupled state according to an embodiment of the disclosure.

FIG. 7A is a schematic diagram of the first coupling member 270 and the second coupling member 280 that are in a decoupled state according to an embodiment of the disclosure, and FIG. 7B is a schematic diagram of the first coupling member 270 and the second coupling member 280 that are in a coupled state according to an embodiment of the disclosure. FIG. 7A and FIG. 7B show lower surfaces of the first plate 210 and the third plate 230, that is, sides of the first plate 210 and the third plate 230 facing the first body 120 and the second body 140.

Referring to FIG. 7A and FIG. 7B, the first coupling member 270 includes a first groove 272 and a slider 274, and the second coupling member 280 includes a second groove 282 and a first magnetic attractor 284.

The first groove 272 is provided on the first side 212 of the first plate 210, and the slider 274 is disposed in the first groove 272. The second groove 282 is provided on the second side 232 of the third plate 230, the magnetic attractor 284 is movably disposed in the second groove 282, and the slider 274 includes a protruding portion 2742 on a side facing the second groove 282. The protruding portion 2742 movably protrudes from the first groove 272. In an embodiment, the slider 274 is made of a magnetic material.

Referring to FIG. 7B, when the first groove 272 is close to the second groove 282, the slider 274 falls within a magnetic attraction range of the first magnetic attractor 284 and is driven by the first magnetic attractor 284 to move toward a direction of the second groove 282 (a direction indicated by an arrow), to make the protruding portion 2742 of the slider 274 protrude from the first groove 272 and extend into the second groove 282.

In an embodiment, when the protruding portion 2742 of the slider 274 extends into the second groove 282, the protruding portion 2742 directly abuts against the first magnetic attractor 284, to further prevent a joint of the third plate 230 and the first plate 210 from moving along with a joint surface.

To prevent the protruding portion 2742 of the slider 274 from protruding from the first groove 272 when the first coupling member 270 and the second coupling member 280 are in a decoupled state, a coupling action of the first coupling member 270 and the second coupling member 280 is interfered with.

In an embodiment, referring to FIG. 7A, the first coupling member 270 further includes an elastic part 276. The elastic part 276 is disposed in the first groove 272, and abuts against the slider 274, so that the slider 274 is accommodated inside the first groove 272. Only when the first coupling member 270 is sufficiently close to the second coupling member 280 to make a magnetic attraction force of the first magnetic attractor 284 greater than a force applied by the elastic part 276 to the slider 274, the slider 274 is driven by the first magnetic attractor 284 to move toward a direction of the second groove 282.

FIG. 8 is a schematic diagram of a first coupling member and a second coupling member according to another embodiment of the disclosure. The figure shows that the first coupling member 370 and the second coupling member 280 are in a decoupled state. Compared with the embodiment in FIG. 7A in which the coupling member 270 uses the elastic part 276 to make the slider 274 be accommodated inside the first groove 272, the first coupling member 370 in this embodiment further includes a second magnetic attractor 376, disposed in a first groove 372.

The second magnetic attractor 376 is configured to generate a magnetic attraction force to make the slider 374 be accommodated inside the first groove 372. Only when the first coupling member 370 is sufficiently close to the second coupling member 280 to make a magnetic attraction force of the first magnetic attractor 284 greater than a magnetic attraction force applied by the second magnetic attractor 376 to the slider 374, the slider 374 is driven by the first magnetic attractor 284 to move toward a direction of the second groove 282.

The electronic device 10 of the disclosure includes the first plate 210, the second plate 220, and the third plate 230, which, as supports, provide supporting effects in two placement directions, that is, a horizontal placement direction and a vertical placement direction, and provide a user with more diversified choices in use.

The above are merely preferred embodiments of the disclosure, and do not constitute any limitation on the disclosure. The disclosure can be implemented in any suitable form. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. An electronic device, comprising:
   a first body, wherein a rear surface of the first body is divided into a first region and a second region;
   a second body, wherein a rear surface of the second body is divided into a third region and a fourth region;
   a first pivot structure, having a first rotation axis, and being pivotally connected between the second body and the first body;
   a first plate, disposed corresponding to the first region and comprising a first coupling member;
   a second plate, disposed corresponding to the third region;
   a third plate, disposed corresponding to the fourth region and comprising a second coupling member, wherein one side of the third plate is adjacent to the second plate, and the other side of the third plate is detachably coupled to the first coupling member through the second coupling member;
   a second pivot structure, connecting the first body and the first plate, and having a second rotation axis, wherein the second rotation axis is perpendicular to the first rotation axis; and
   a third pivot structure, being close to the first pivot structure, connecting the second body and the second plate, and having a third rotation axis, wherein the third rotation axis is parallel to the first rotation axis,
   wherein the first coupling member comprises a first groove and a slider, and the second coupling member comprises a second groove and a first magnetic attractor, the slider is movably disposed in the first groove, the first magnetic attractor is disposed in the second groove, the slider comprises a protruding portion on a side facing the second groove, and the first magnetic attractor is configured to drive the slider when the first groove is close to the second groove, to make the protruding portion extend into the second groove,
   wherein the first coupling member further comprises an elastic part, disposed in the first groove.

2. The electronic device according to claim 1, wherein the first coupling member is detachably coupled to the second coupling member through magnetic attraction.

3. The electronic device according to claim 1, further comprising a first flexible coating layer, covering the second plate and the third plate, and coupling the second plate to the third plate.

4. The electronic device according to claim 1, further comprising a fourth plate and a second flexible coating layer, wherein the fourth plate is fixed to the first body, and the second flexible coating layer covers the first plate and the fourth plate, and couples the first plate to the fourth plate.

5. The electronic device according to claim 1, wherein the second pivot structure is a torque hinge.

6. The electronic device according to claim 1, wherein the third pivot structure is a torque hinge.

* * * * *